US011275098B2

(12) United States Patent
Dwyer

(10) Patent No.: US 11,275,098 B2
(45) Date of Patent: Mar. 15, 2022

(54) ACCELEROMETER INCLUDING RECTANGULAR COIL AND RECTANGULAR POLE PIECE

(71) Applicant: Honeywell International Inc., Morris Plains, NJ (US)

(72) Inventor: Paul W. Dwyer, Seattle, WA (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 16/928,725

(22) Filed: Jul. 14, 2020

(65) Prior Publication Data

US 2022/0018872 A1  Jan. 20, 2022

(51) Int. Cl.
*G01P 15/13* (2006.01)
*G01P 15/125* (2006.01)

(52) U.S. Cl.
CPC .......... *G01P 15/132* (2013.01); *G01P 15/125* (2013.01)

(58) Field of Classification Search
CPC ................................................... G01P 15/132
USPC ....................................................... 73/514.17
See application file for complete search history.

(56) References Cited

U.S. PATENT DOCUMENTS

| | | | |
|---|---|---|---|
| 4,663,972 A | 5/1987 | Gerard | |
| 5,331,852 A | 7/1994 | Greiff et al. | |
| 5,693,883 A | 12/1997 | Giroud et al. | |
| 6,631,643 B2 | 10/2003 | Malvern et al. | |
| 7,059,189 B2 | 6/2006 | Drabe et al. | |
| 7,191,654 B2 | 3/2007 | Dwyer et al. | |
| 7,926,348 B2 | 4/2011 | Dwyer | |
| 8,065,915 B2 | 11/2011 | Paul et al. | |
| 8,640,541 B2 | 2/2014 | Abdel Aziz et al. | |
| 9,016,126 B2 | 4/2015 | Dwyer et al. | |
| 9,250,261 B2 | 2/2016 | Lin et al. | |
| 9,829,544 B2 | 11/2017 | Bulatowicz | |
| 10,024,880 B2 | 7/2018 | Stoops et al. | |
| 10,161,956 B2 | 12/2018 | Dwyer | |
| 10,401,378 B2 | 9/2019 | Dwyer et al. | |
| 2003/0140699 A1 | 7/2003 | Thomas et al. | |
| 2010/0180681 A1 | 7/2010 | Dwyer | |

(Continued)

FOREIGN PATENT DOCUMENTS

JP  H04315057 A  11/1992
JP  H065231 B2  1/1994

OTHER PUBLICATIONS

Extended Search Report from counterpart European Application No. 21184097.0 dated Dec. 10, 2021, 10 pp.

*Primary Examiner* — Walter L Lindsay, Jr.
*Assistant Examiner* — Philipmarcus T Fadul
(74) *Attorney, Agent, or Firm* — Shumaker & Sieffert, P.A.

(57) ABSTRACT

This disclosure is related to devices, systems, and techniques for determining an acceleration. For example, an accelerometer system includes a proof mass, a pole piece connected to the proof mass, and a coil disposed around the pole piece and connected to the proof mass, where the coil is rectangular in shape. Additionally, the accelerometer system includes circuitry configured to deliver an electrical signal to the coil in order to maintain the proof mass at a null position and determine an electrical current value corresponding to the electrical signal. Additionally, the circuit is configured to identify, based on the electrical current value, an acceleration of the accelerometer system.

18 Claims, 7 Drawing Sheets

(56) References Cited

U.S. PATENT DOCUMENTS

| | | | | |
|---|---|---|---|---|
| 2013/0255381 A1* | 10/2013 | Ricotti | ............... | B81C 1/0023 |
| | | | | 73/514.31 |
| 2017/0115321 A1* | 4/2017 | Dwyer | ............... | G01P 15/132 |
| 2019/0082262 A1 | 3/2019 | Ilkorur et al. | | |

* cited by examiner

ACCELEROMETER INCLUDING RECTANGULAR COIL AND RECTANGULAR POLE PIECE

TECHNICAL FIELD

This disclosure relates to accelerometers.

BACKGROUND

Accelerometers function by detecting a displacement of a proof mass under inertial forces. Some accelerometers include a capacitive pick-off system. For example, electrically conductive material (e.g., a capacitor plate) may be deposited on the upper surface of the proof mass, and similar electrically conductive material may be deposited on the lower surface of the proof mass. An acceleration or force applied along the sensitive axis of the accelerometer causes the proof mass to deflect either upwardly or downwardly causing the distance (e.g., a capacitive gap) between the pick-off capacitance plates and upper and lower non-moving members to vary. This variance in the capacitive gap causes a change in the capacitance of the capacitive elements, which is representative of the displacement of the proof mass along the sensitive axis. The change in the capacitance may be used as a displacement signal, which may be applied to a servo system that includes one or more electromagnets (e.g., a force-rebalancing coil) to return the proof mass to a null or at-rest position.

SUMMARY

In general, the disclosure is directed to devices, systems, and techniques for determining an acceleration of one or more devices. For example, an electromagnetic accelerometer may prevent a displacement of a proof mass by delivering an electrical current to a coil, causing a Lorentz force to prevent a displacement of the proof mass relative to one or more non-moving members. For example, a magnetic flux may form a loop between a pole piece, the coil, and a non-moving member. This magnetic flux and the electrical current flowing through the coil may cause a servo effect which prevents the displacement of the proof mass relative to one or more non-moving members. A relationship may exist between the magnitude of the electrical current and the acceleration of the proof mass along a sensing axis of the accelerometer such that processing circuitry can calculate the acceleration based on the magnitude of the electrical signal delivered to the coil.

The pole piece, in some cases, is rectangular in shape, and the coil may be disposed around the pole piece such that the pole piece fits through a center of the coil. The coil may also be rectangular in shape. As such, a magnitude of the magnetic field may be constant in an area between a first side of the pole piece to the non-moving member. For example, the rectangular pole piece includes four sides. A magnitude of the magnetic field at the first side of the pole piece may be substantially the same as a magnitude of the magnetic field at a first distance outward from the first side of the pole piece. It may be beneficial for the magnetic field between the pole piece and the non-moving member to be constant so that a movement of the coil relative to the pole piece does not affect the Lorentz force which prevents the displacement of the proof mass. That is, the accelerometer may more precisely determine the acceleration of the proof mass along the sensing axis when the magnetic field between the pole piece and the non-moving member is constant as compared with accelerometers in which the magnetic field between a pole piece and a non-moving member is variable.

In some examples, an accelerometer system includes a proof mass and a pole piece, where the pole piece is connected to the proof mass. Additionally, the accelerometer system includes a coil disposed around the pole piece, where the coil is connected to the proof mass, and wherein the coil is rectangular in shape. Additionally, the accelerometer system includes circuitry configured to deliver an electrical signal to the coil in order to maintain the proof mass at a null position, determine an electrical current value corresponding to the electrical signal, and identify, based on the electrical current value, an acceleration of the accelerometer system.

In some examples, a method includes delivering, by circuitry of an accelerometer system, an electrical signal to a coil in order to maintain a proof mass at a null position. The accelerometer system includes the proof mass, a pole piece, where the pole piece is connected to the proof mass, and the coil disposed around the pole piece, where the coil is connected to the proof mass, and where the coil is rectangular in shape. Additionally, the accelerometer system includes the circuitry. The method further comprises determining, by the circuitry, an electrical current value corresponding to the electrical signal and identifying, by the circuitry based on the electrical current value, an acceleration of the accelerometer system.

In some examples, an accelerometer system includes a coil disposed around a pole piece, where the coil is connected to a proof mass, and where the coil is rectangular in shape. Additionally, the accelerometer system includes circuitry configured to deliver an electrical signal to the coil in order to maintain the proof mass at a null position, determine an electrical current value corresponding to the electrical signal, and identify, based on the electrical current value, an acceleration of the accelerometer system.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
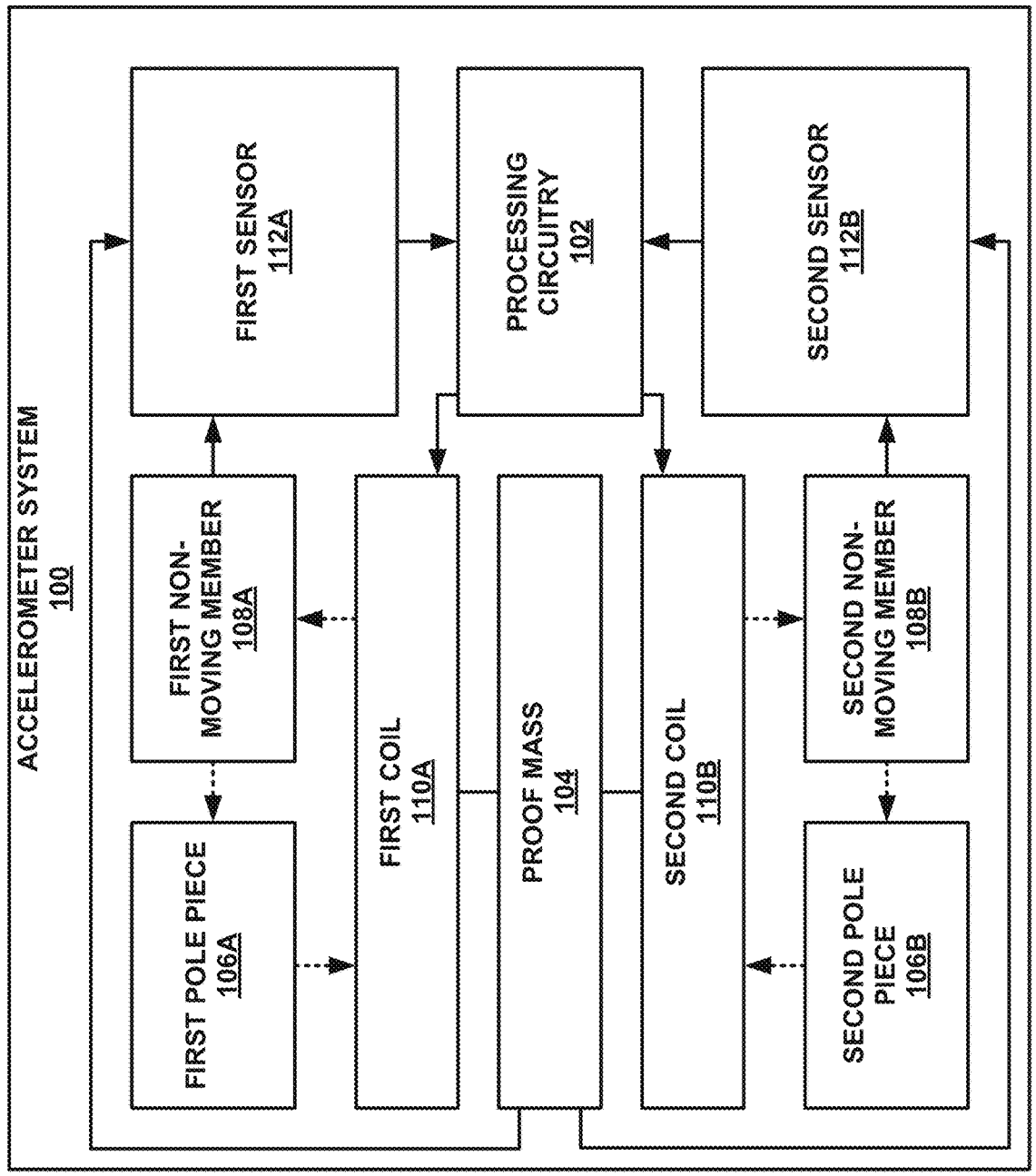
FIG. 1 is a block diagram illustrating an accelerometer system, in accordance with one or more techniques of this disclosure.

This disclosure is directed to devices, systems and techniques for determining an acceleration of an object using an accelerometer system. For example, the accelerometer system may be an electromagnetic accelerometer system configured to precisely measure acceleration values. The electromagnetic accelerometer system uses a combination of electrical signals and magnetic signals to determine the acceleration of the object. For example, the accelerometer system may include a magnetic pole piece, an electrical coil, a non-moving member, and a proof mass. A magnetic flux may travel from the pole piece, through the coil to the non-moving member, and back to the pole piece. An electrical current may flow through the coil. The accelerometer system may generate a Lorentz force based on the magnetic flux and the electrical current, the Lorentz force representing a servo effect which prevents a displacement of the proof mass.

In some cases, the accelerometer system is configured to measure the acceleration of the object in real-time or near real-time, such that processing circuitry may analyze the acceleration of the object over a period of time to determine a positional displacement of the object during the period of time. For example, the accelerometer system may be a part of an inertial navigation system (INS) for tracking a position of an object based, at least in part, on an acceleration of the object. Additionally, the accelerometer system may be located on or within the object such that the accelerometer system accelerates with the object. As such, when the object accelerates, the acceleration system (including the proof mass) accelerates with the object. Since acceleration over time is a derivative of velocity over time, and velocity over time is a derivative of position over time, processing circuitry may, in some cases, be configured to determine the position displacement of the object by performing a double integral of the acceleration of the object over the period of time. Determining a position of an object using the accelerometer system located on the object—and not using a navigation system external to the object (e.g., a global navigation satellite system (GNSS))—may be referred to as "dead reckoning."

In order to more accurately track the position of the object using the INS, it may be beneficial to improve a quality of acceleration values determined by the accelerometer system. For example, the accelerometer system may be configured to determine an acceleration along a sensing axis which is perpendicular to a plane of the proof mass. When the accelerometer system is accelerating according to a vector which includes a component parallel to the sensing axis and at least one component perpendicular to the sensing axis, the accelerometer system my precisely determine that magnitude of the component that is parallel to the sensing axis.

Forces which are perpendicular to the sensing axis of the accelerometer system may be referred to herein as "sideways" forces. The accelerometer system may prevent sideways forces form adversely impacting a precision in which the accelerometer system measures acceleration. For example, a pole piece may be located within a center of a coil. In some examples, the coil is rectangular in shape with a rectangular-shaped opening in its center, and a cross-section of the pole piece is rectangular such that the pole piece fits through the rectangular-shaped opening of the coil. In some examples, there may be a gap between the pole piece and the coil on each side of the pole piece. For example, the pole piece may include a first side, a second side, a third side, and fourth side, since the cross-section of the pole piece is rectangular. Sideways forces (e.g., vibration forces) may temporarily cause the coil to move with respect to the pole such that the coil moves closer to the first side of the pole piece and farther from the second side of the pole piece, for example.

Due to the pole piece being rectangular in shape, a magnetic field on each of the four sides of the pole piece may remain constant moving away from the pole piece. In this way, movements of the coil relative to the pole piece might not affect a magnitude of a Lorentz force produced by the accelerometer system. For example, even if the coil were to move sideways relative to the pole piece, a magnitude of the magnetic field flowing across the coil from the pole piece will remain constant. The Lorentz force represents a cross product of the magnetic field across the coil and an electrical current flowing through the coil. Consequently, due to the fact that the magnetic field across the coil remains constant even when the coil moves sideways relative to the pole piece, sideways movements of the coil might not affect a magnitude of the Lorentz force.

FIG. 1 is a block diagram illustrating an accelerometer system 100, in accordance with one or more techniques of this disclosure. As illustrated in FIG. 1, accelerometer system 100 includes processing circuitry 102, proof mass 104, first pole piece 106A, second pole piece 106B (collectively, "pole pieces 106"), first non-moving member 108A, second non-moving member 108B (collectively, "non-moving members 108"), first coil 110A, second coil 110B (collectively, "coils 110"), first sensor 112A, and second sensor 112B (collectively, "sensors 112").

Accelerometer system 100 is configured to determine an acceleration associated with an object (not illustrated in FIG. 1) based on a magnitude of one or more electrical signals delivered to coils 110, the electrical signals preventing proof mass 104 from displacing from a null position. For example, first sensor 112A may be configured to generate a first sense signal which indicates a size of a gap between proof mass 104 and first non-moving member 108A and second sensor 112B may be configured to generate a second sense signal which indicates a size of a gap between proof mass 104 and second non-moving member 108B. Processing circuitry 102 may generate a first electrical signal for delivery to first coil 110A based on the first sense signal and generate a second electrical signal for delivery to second coil 110B based on the second sense signal. The first electrical signal and the second electrical signal may induce one or more Lorentz forces which prevent the displacement of proof mass 104 from a null position.

A Lorentz force represents a force caused by an interaction of an electric fields and a magnetic field. For example, a Lorentz force may be defined by a cross-product of an electrical field and a magnetic field, where the direction of the Lorentz force depends on the direction of the electrical field and the direction of the magnetic field, and where the magnitude of the Lorentz force depends on the magnitude of the electrical field and the magnitude of the magnetic field.

Processing circuitry 102 may include one or more processors that are configured to implement functionality and/or process instructions for execution within accelerometer system 100. For example, processing circuitry 102 may be capable of processing instructions stored in a memory. Processing circuitry 102 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 102 may include any suitable structure, whether in hardware, software, firmware, or any combination thereof, to perform the functions ascribed herein to processing circuitry 102.

A memory (not illustrated in FIG. 1) may be configured to store information within accelerometer system 100 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 102.

Processing circuitry 102 may generate the first electrical signal and the second electrical signal as a part of a one or more negative feedback loops which maintain proof mass 104 in the null position. Processing circuitry 102, first coil 110A, and first sensor 112A represent components of a first negative feedback loop. The first negative feedback loop may maintain a width of the gap between proof mass 104 and first non-moving member 108A at a first null width. For example, first sensor 112A may generate the first sense signal which indicates a capacitance value. The capacitance value is correlated with the width of the gap between proof mass 104 and first non-moving member 108A and delivers the first sense signal to processing circuitry 102. Processing circuitry 102 may generate the first electrical signal based on the first sense signal and deliver the first electrical signal to first coil 110A in order to maintain the capacitance value of the first sense signal at a first null capacitance value. By generating the first electrical signal in order to maintain the capacitance value of the first sense signal at the first null capacitance value, processing circuitry 102 maintains a width of the gap between the proof mass 104 and the first non-moving member 108A at the first null width.

Processing circuitry 102, second coil 110B, and second sensor 112B represent components of a second negative feedback loop. The second negative feedback loop may maintain a width of the gap between proof mass 104 and second non-moving member 108B at a second null width. For example, second sensor 112B may generate the second sense signal which indicates a second capacitance value. The capacitance value is correlated with the width of the gap between proof mass 104 and second non-moving member 108B and delivers the second sense signal to processing circuitry 102. Processing circuitry 102 may generate the second electrical signal based on the second sense signal and deliver the second electrical signal to second coil 110B in order to maintain the capacitance value of the second sense signal at a second null capacitance value. By generating the second electrical signal in order to maintain the second capacitance value of the second sense signal at the second null capacitance value, processing circuitry 102 maintains a width of the gap between the proof mass 104 and the second non-moving member 108B at the second null width.

Additionally, by maintaining the width of the gap between the proof mass 104 and the first non-moving member 108A at the first null width and maintaining the width of the gap between the proof mass 104 and the second non-moving member 108B at the second null width, processing circuitry 102 may maintain a position of proof mass 104 at a null position relative to non-moving members 108.

When an acceleration of accelerometer system 100 along a sense axis changes, the resulting acceleration force applied to proof mass 104 may change. Consequently, processing circuitry 102 may change change a magnitude of the first electrical signal delivered to first coil 110A and the second electrical signal delivered to second coil 110B in order to prevent a displacement of proof mass 104 relative to non-moving members 108. In one example, the acceleration along the sense axis may increase from a first acceleration value to a second acceleration value. The processing circuitry 102 may change the magnitude of the first electrical signal and change the magnitude of the second electrical signal in order to account for the change in acceleration so that proof mass 104 remains in the null position relative to non-moving members 108. Processing circuitry 102 may determine the acceleration of accelerometer system 100 along the sense axis based on the magnitude of the first electrical signal delivered to first coil 110A and the magnitude of the second electrical signal delivered to second coil 110B.

In some examples, the magnitude of the first electrical signal delivered to first coil 110A is proportional to the acceleration along the sense axis. In some examples, the magnitude of the second electrical signal delivered to second coil 110B is proportional to the acceleration along the sense axis. As such, an increase in the magnitude of the first electrical signal may correspond to an increase in the acceleration along the sense axis and an increase in the magnitude of the second electrical signal may correspond to an increase in the acceleration along the sense axis. Alternatively, a decrease in the magnitude of the first electrical signal may correspond to a decrease in the acceleration along the sense axis and a decrease in the magnitude of the second electrical signal may correspond to a decrease in the acceleration along the sense axis.

Accelerometer system 100 may include a first magnetic flux loop and a second magnetic flux loop. The first magnetic flux loop may include first pole piece 106A, first non-moving member 108A, and first coil 110A. Within the first magnetic flux loop, a first magnetic flux may travel from first pole piece 106A through first coil 110A to first non-moving member 108A. The first magnetic flux then travels through first non-moving member 108A back to first pole piece 106A. In some examples, first pole piece 106A may include a first magnet which generates the first magnetic flux. The second magnetic flux loop may include second pole piece 106B, second non-moving member 108B, and second coil 110B. Within the second magnetic flux loop, a second magnetic flux may travel from second pole piece 106B through second coil 110B to second non-moving member 108B. The second magnetic flux then travels through second non-moving member 108B back to second pole piece 106B. In some examples, second pole piece 106B may include a second magnet which generates the second magnetic flux.

Accelerometer system 100 may represent a servo system which counter-balances acceleration along the sense axis with Lorentz forces parallel to the sense axis. For example, if accelerometer system 100 accelerates along the sense axis, the acceleration may apply an acceleration force to the proof mass 104, where the acceleration force is applied to proof mass 104 in an opposite direction of the acceleration of accelerometer system 100. Processing circuitry 102 delivers the first electrical signal to first coil 110A and delivers the second electrical signal to second coil 110B in order to generate one or more Lorentz forces which counter-balance the acceleration force resulting form the acceleration along the sense axis. That is, the one or more Lorentz forces are applied to proof mass 104 in an opposite direction to the acceleration force, such that proof mass 104 is not displaced from a null position by the acceleration force. The magnitude of the acceleration force changes based on the magnitude of the acceleration along the sense axis. As such, to prevent the displacement of proof mass 104 from the null position, processing circuitry 102 changes the magnitude of the first electrical signal delivered to first coil 110A and the magnitude of the second electrical signal delivered to second coil 110B in order to change the magnitude of the one or more Lorentz forces which counter-balance the acceleration signal.

Lorentz forces are forces which arise from an interaction between an electrical field and a magnetic field. As discussed above, accelerometer system 100 includes a first magnetic flux loop and a second magnetic flux loop. The first magnetic flux loop includes a passage of a first magnetic flux from the pole piece 106A to first non-moving member 108A through first coil 110A. The first electrical signal flows through first coil 110A. The first magnetic flux and the first electrical signal may cause a first Lorentz force to be applied to proof mass 104 in an opposite direction of the acceleration force applied to proof mass 104 due to the acceleration along the sense axis. Additionally, the second magnetic flux loop includes a passage of a second magnetic flux from the second pole piece 106B to second non-moving member 108B through second coil 110B. The second electrical signal flows through second coil 110B. The second magnetic flux and the second electrical signal may cause a second Lorentz force to be applied to proof mass 104 in an opposite direction of the acceleration force applied to proof mass 104 due to the acceleration along the sense axis.

In some examples, pole pieces 106 may be square in shape, and coils 110 may be square in shape such that respective openings of coils 110 are configured to receive pole pieces 106. For example, first coil 110A may include a first opening which receives first pole piece 106A which includes a square-shaped cross-section. Second coil 110B may include a second opening which receives second pole piece 106B which includes a square-shaped cross-section. As discussed above, accelerometer system 100 includes a first magnetic flux loop and a second magnetic flux loop. As a part of the first magnetic flux loop, a first magnetic flux may flow out each side of the four sides of first pole piece 106A.

Since the cross-section of first pole piece 106A is rectangular, the magnetic field in a first area extending away from a first side of first pole piece 106A may be uniform in magnitude, the magnetic field in a second area extending away from a second side of first pole piece 106A may be uniform in magnitude, the magnetic field in a third area extending away from a third side of first pole piece 106A may be uniform in magnitude, and the magnetic field in a fourth area extending away from a fourth side of first pole piece 106A may be uniform in magnitude. The first area extends from the first side of first pole piece 106A to first non-moving member 208A, meaning that the magnetic field in a space between the first side of first pole piece 106A and first non-moving member 208A is uniform. The second area extends from the second side of first pole piece 106A to first non-moving member 208A, meaning that the magnetic field in a space between the second side of first pole piece 106A and first non-moving member 208A is uniform. The third area extends from the third side of first pole piece 106A to first non-moving member 208A, meaning that the magnetic field in a space between the third side of first pole piece 106A and first non-moving member 208A is uniform. The fourth area extends from the fourth side of first pole piece 106A to first non-moving member 208A, meaning that the magnetic field in a space between the fourth side of first pole piece 106A and first non-moving member 208A is uniform.

Since the cross-section of second pole piece 106B is rectangular, the magnetic field in a first area extending away from a first side of second pole piece 106B may be uniform in magnitude, the magnetic field in a second area extending away from a second side of second pole piece 106B may be uniform in magnitude, the magnetic field in a third area extending away from a third side of second pole piece 106B may be uniform in magnitude, and the magnetic field in a fourth area extending away from a fourth side of second pole piece 106B may be uniform in magnitude. The first area extends from the first side of second pole piece 106B to second non-moving member 208B, meaning that the magnetic field in a space between the first side of second pole piece 106B and second non-moving member 208B is uniform. The second area extends from the second side of second pole piece 106B to second non-moving member 208B, meaning that the magnetic field in a space between the second side of second pole piece 106B and second non-moving member 208B is uniform. The third area extends from the third side of second pole piece 106B to second non-moving member 208B, meaning that the magnetic field in a space between the third side of second pole piece 106B and second non-moving member 208B is uniform. The fourth area extends from the fourth side of second pole piece 106B to second non-moving member 208B, meaning that the magnetic field in a space between the fourth side of second pole piece 106B and second non-moving member 208B is uniform.

Sideways movements may displace a coil relative to the respective pole piece. These sideways movements may cause, for example, first coil 110A to move sideways relative to first pole piece 106A. In some examples, first coil 110A passes through a first area which extends from the first side of first pole piece 106A to first non-moving member 208A, a second area which extends from the second side of first pole piece 106A to first non-moving member 208A, a third area which extends from the third side of first pole piece 106A to first non-moving member 208A, and a fourth area which extends from the fourth side of first pole piece 106A to first non-moving member 208A. In some examples, a sideways movement of coil 110A causes coil 110A to move closer to pole piece 106A in the first area and move away from pole piece 106A in the second area. In at least some such examples, the magnetic field across first coil 110A does not change since the magnetic field in the first area is uniform and the magnetic field in the second area is uniform.

Figure 2:
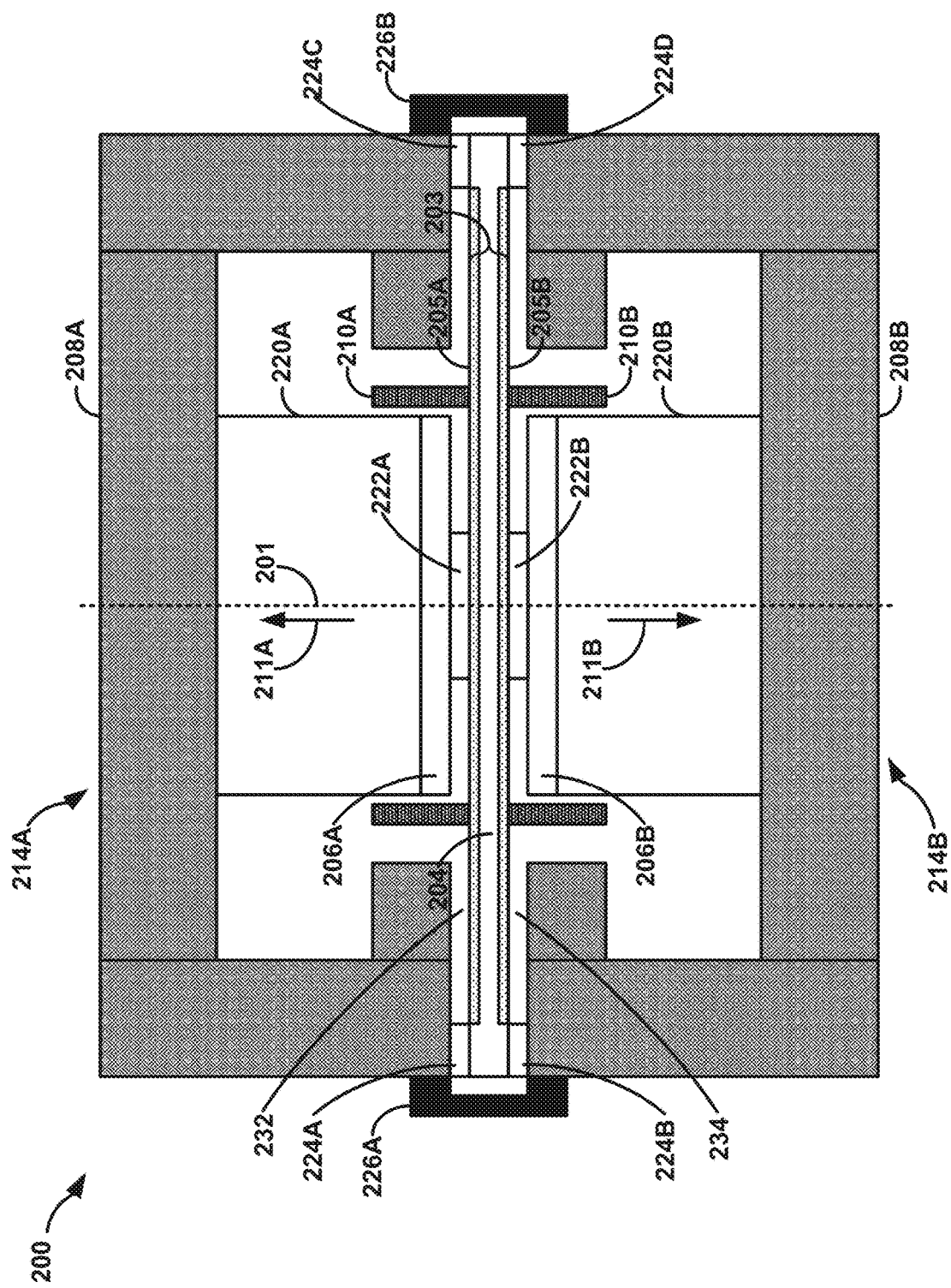
FIG. 2 is a conceptual diagram illustrating a side cutaway view of an accelerometer system, in accordance with one or more techniques of this disclosure.

FIG. 2 is a conceptual diagram illustrating a side cutaway view of an accelerometer system 200, in accordance with one or more techniques of this disclosure. As seen in FIG. 2, accelerometer system 200 includes proof mass assembly 203, first pole piece 206A, second pole piece 206B (collectively, "pole pieces 206"), first non-moving member 208A, second non-moving member 208B (collectively, "non-moving members 208"), first coil 210A, second coil 210B (collectively, "coils 210"), first magnet 220A, and second magnet 220B (collectively, "magnets 220"). Proof mass assembly 203 includes proof mass 204, first capacitive plate 205A, and second capacitive plate 205B (collectively, "capacitive plates 205"). In the example of FIG. 2, accelerometer system 200 further includes center raised pads 222A-222B (collectively, "center raised pads 222"), outer raised pads 224A-224D (collectively, "outer raised pads 224"), first band 226A, second band 226B (collectively, "bands 226"), first capacitive gap 232, and second capacitive gap 234. In the example of FIG. 2, accelerometer system 200 may include accelerometer supports 214A-214B (collectively, "accelerometer supports 214"), which may be formed by a combination of pole pieces 206, non-moving members 208, and magnets 220. Accelerometer system 200 may be an example of accelerometer system 100 of FIG. 1. Proof mass 204 may be an example of proof mass 104 of FIG. 1. Pole pieces 206 may be an example of pole pieces 106 of FIG. 1. Non-moving members 208 may be an example of non-moving members 108 of FIG. 1. Coils 110 may be an example of coils 210 of FIG. 1.

Accelerometer system 200 may be configured to sense an acceleration along sense axis 201. For example, accelerometer system 200 may be configured to sense an acceleration along sense axis 201 in a first direction 211. In some cases, accelerometer system 200 precisely determines a magnitude of the acceleration along the sense axis 201 in the first direction 211 in real time or near-real time such that processing circuitry (not illustrated in FIG. 2) may track a position of accelerometer system 200 using dead reckoning. As seen in FIG. 2, proof mass assembly 203 is suspended between first non-moving member 208A and second non-moving member 208B by center raised pads 222 and outer raised pads 224. In some examples, the processing circuitry may receive a first sense signal indicative of a width of first capacitive gap 232 and receive a second sense signal indicative of a width of second capacitive gap 234. In turn, the processing circuitry may deliver a first electrical signal to first coil 210A and deliver a second electrical signal to second coil 210B in order to prevent a displacement of proof mass 204 in response to an acceleration of accelerometer system 200 along sense axis 201. The magnitude of the first electrical signal and the magnitude of the second electrical signal may be correlated with the magnitude of the acceleration.

Non-moving members 208 may be attached to (e.g., clamped) center raised pads 222 and outer raised pads 224, securing proof mass assembly 203 between first non-moving member 208A and second non-moving member 208B. The term "non-moving member" may refer to a member representing a reference position by which a position of proof mass assembly 203 may be compared. In other words, the position of proof mass assembly 203 may represent a position of proof mass assembly 203 relative to non-moving members 208. In some examples, non-moving members 208 include dual metal materials, which may be part of a magnetic flux loop. In some examples, non-moving members 208 may be similar to stators of a variable capacitor.

Coils 210 may, in some cases, conduct electricity such that electrical signals flow through coils 210. For example, a first electrical signal may flow through a path of first coil 210A and a second electrical signal may flow through a path of second coil 210B. The path of first coil 210A may form a square path and the path of second coil 210B may form a square path. Since FIG. 2 represents a cutaway view of accelerometer system 200, the square path of first coil 210A and the square path of second coil 210B is not illustrated in FIG. 2. Coils 210 extend fully around an outer surface of pole pieces 206 such that the first electrical signal flows around the outer surface of pole piece 206A through first coil 210A and the second electrical signal flows around the outer surface of pole piece 206B through second coil 210B.

Bands 226 are a metal pieces which fasten first non-moving member 208A to second non-moving member 208B. In some examples, bands 226 may be attached to (e.g., bonded with epoxy) non-moving members 208, when non-moving members 208 are attached to proof mass assembly 203 by center raised pads 222 and outer raised pads 224. Accelerometer system 200 includes first capacitive gap 232 and second capacitive gap 234. First capacitive gap 232 represents a gap between first capacitive plate 205A and first non-moving member 208A, second capacitive gap 234 represents a gap between second capacitive plate 205B and second non-moving member 208B. First capacitive plate 205A may generate a first sense signal which indicates a first capacitance value. The first capacitance value is correlated with a width of first capacitive gap 232. Second capacitive plate 205B may generate a second sense signal which indicates a second capacitance value. The second capacitance value is correlated with a width of second capacitive gap 234. In this way, first capacitive plate 205A may represent first sensor 112A of FIG. 1 and second capacitive plate 205B may represent second sensor 112B of FIG. 1. Processing circuitry (not illustrating in FIG. 2) may receive the first sense signal and the second signal and control electrical signals delivered to coils 210 based on the first sense signal and the second sense signal.

A null width of first capacitive gap 232 may, in some examples, be defined by a width of outer raised pads 224 and center raised pads 222. In some examples, the null width of first capacitive gap 232 is within a range from 0.0005 inches to 0.0025 inches. A null width of second capacitive gap 234 may, in some examples, be defined by a width of outer raised pads 224 and center raised pads 222. In some examples, the null width of second capacitive gap 234 is within a range from 0.0005 inches to 0.0025 inches. When the width of first capacitive gap 232 is at the null width of first capacitive gap 232 and the width of second capacitive gap 234 is at the null width of second capacitive gap 234, proof mass 204 may be located at a null position. That is, proof mass 204 may be located at the null position such that the processing circuitry is configured to determine the acceleration along sense axis 201 based on the first electrical signal delivered to first coil 210A and the second electrical signal delivered to second coil 210B.

In some examples, first capacitive gap 232 may have a first capacitance value. The processing circuitry may detect the first capacitance value of first capacitive gap 232, which in a closed-loop differential capacitance configuration can be detected and used by the processing circuitry to determine the acceleration of accelerometer system 200. Additionally, second capacitive gap 234 may have a second capacitance value. The processing circuitry may detect the second capacitance value of second capacitive gap 234, which in a closed-loop differential capacitance configuration can be detected and used by the processing circuitry to determine the acceleration of accelerometer system 200. In some examples, an increase in a width of first capacitive gap 232 and a decrease in a width of second capacitive gap 234 may be indicative of an acceleration of accelerometer system 200 in first direction 211A. Conversely, an increase in the width of second capacitive gap 234 and a decrease in the width of first capacitive gap 232 may be indicative of an acceleration of accelerometer system 200 in the second direction 211B. The processing circuitry may deliver the first electrical signal to first coil 210A and deliver the second electrical signal to second coil 210B in order to counter-balance a displacement of proof mass 204 from the null position. The magnitude of the first electrical signal and the magnitude of the second electrical signal may be correlated with the magnitude of the acceleration along sense axis 201.

Magnets 220 are magnets for providing a magnetic field to drive magnetic circuits of magnets 220, pole pieces 206, coils 210, and non-moving members 208. In some examples, magnets 220 may be made of Alnico, samarium-cobalt, neodymium-iron-boron, or other such materials. In some examples, magnets 220 may receive the forces and/or strains transmitted from non-moving members 208 caused by the construction of accelerometer system 200. In some examples, magnets 220 may be part of a zero gauge configuration of accelerometer system 200.

Pole pieces 206 are magnetic structure that enables the magnetic field of magnets 220 to be focused and drive the magnetic circuit of magnets 220, pole pieces 206, coils 210, and non-moving members 208. For example, pole pieces 206 may be magnetic structures that enable the magnetic field of the magnet to turn a corner and flow through coils 210. In these examples, by allowing the magnetic field of magnets 220 to go through coils 210, the magnetic field of magnets 220 may enter non-moving members 208 and flow around to the opposite side of the magnet through non-moving members 208, and flow back through the magnet to the pole piece completing the magnetic circuit. For example, a first magnetic circuit may represent a magnetic flux loop in which a first magnetic flux passes from first magnet 220A to first pole piece 206A. The first magnetic flux travels from first pole piece 206A to first non-moving member 208A through first coil 210A. Then, the first magnetic flux travels through first non-moving member 208A back to first magnet 220A in order to complete the first magnetic circuit. A second magnetic circuit may represent a magnetic flux loop in which a second magnetic flux passes from second magnet 220B to second pole piece 206B. The second magnetic flux travels from second pole piece 206B to second non-moving member 208B through second coil 210B. Then, the second magnetic flux travels through second non-moving member 208B back to second magnet 220B in order to complete the second magnetic circuit.

In some examples, pole pieces 206 may be part of a zero gauge configuration of accelerometer system 200. In some examples, pole pieces 206 may be made from a permeable material such as invar, Mu Metal, Permalloy, or other such material.

In some examples, accelerometer system 200 may include coils 210 attached on each side of the proof mass. In some examples, accelerometer system 200 may include processing circuitry (not illustrated in FIG. 2) configured to deliver a first electrical signal and a second electrical signal to coils 210 in order to position proof mass 204 at the null position. In some examples, when accelerometer system 200 accelerates along sense axis 201, the processing circuitry may increase an electrical current magnitude of the first electrical signal and increase an electrical current magnitude of the second electrical signal to maintain the proof mass 204 at the null position. In this example, the electrical current magnitude of the first electrical signal and the electrical current magnitude of the second electrical signal are proportional to the magnitude of the acceleration along the sense axis 201.

Preventing proof mass 204 from displacing form the null position may be referred to herein as the "servo effect." In some examples, the processing circuitry may cause one or more Lorentz forces to counter-balance an acceleration force applied to proof mass 204 such that proof mass 204 does not move from the null position. This means that the processing circuitry is configured to adjust the one or more Lorentz forces in real time or near-real time such that the one or more Lorentz forces counter-balance the acceleration force applied to proof mass 204 at any given time, thus constantly maintaining the proof mass 204 at the null position. The electrical signals required to induce the one or more Lorentz forces may be generated by the processing circuitry based on the first sense signal received from first capacitive plate 205A and the second sense signal received from the second capacitive plate 205B.

Coils 210 may be mounted on either side of proof mass 204 of proof mass assembly 203. In some examples, processing circuitry may modify the current in coils 210 to servo proof mass 204 to maintain the null position. Any acceleration of accelerometer system 200 will momentarily move the proof mass of proof mass assembly 203 out of the plane of the null position and the increase in current required to maintain proof mass 204 in the null position is proportional to the magnitude of the acceleration of accelerometer system 200 along sense axis 201.

Although FIG. 2 illustrates accelerometer system 200 with a capacitive plate and a coil on both sides of proof mass assembly 203 to form a combined capacitive pick-off system, it is understood that accelerometer system 200 may function with a capacitor plate and a coil on only one side of proof mass assembly 203. Similarly, although FIG. 2 illustrates accelerometer system 200 with a non-moving member on both sides of proof mass assembly 203 to form the combined capacitive pick-off system, it is understood that accelerometer system 200 may function a non-moving member and a capacitor plate on the same side of proof mass assembly 203.

Figure 3:
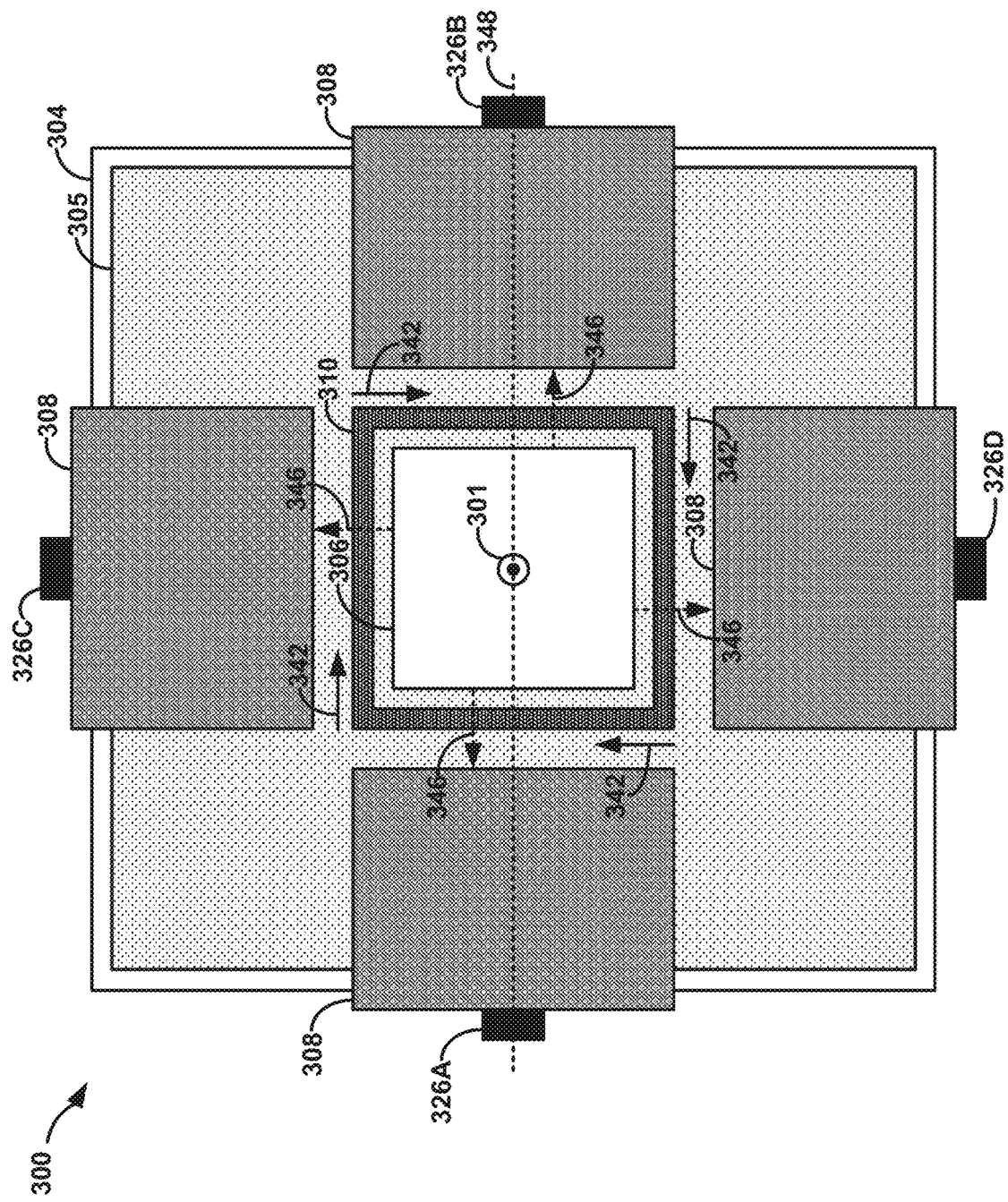
FIG. 3 is a conceptual diagram illustrating a top cutaway view of an accelerometer system, in accordance with one or more techniques of this disclosure.

FIG. 3 is a conceptual diagram illustrating a top cutaway view of an accelerometer system 300, in accordance with one or more techniques of this disclosure. As seen in FIG. 3, accelerometer system 300 includes proof mass 304, capacitive plate 305, pole piece 306, non-moving member 308, coil 310, and bands 326A-326D (collectively, "bands 326"). Accelerometer system 300 may be an example of accelerometer system 200 of FIG. 2. Proof mass 304 may be an example of proof mass 204 of FIG. 2. Capacitive plate 305 may be an example of first capacitive plate 205A of FIG. 2. Pole piece 306 may be an example of first pole piece 206A of FIG. 2. Non-moving member 308 may be an example of first non-moving member 208A of FIG. 2. Coil 310 may be an example of first coil 210A of FIG. 2. In some examples, sense axis 301 of accelerometer system 300 extends into and out from the page of FIG. 3. That is, accelerometer system 300 may sense an acceleration into the page of FIG. 3 and sense an acceleration out of the page of FIG. 3. In some examples, plane 348 represents a cut-out plane which defines the side cutaway view of FIG. 2.

Responsive to an acceleration of accelerometer system 300 along sense axis 301, processing circuitry (not illustrated in FIG. 3) of accelerometer system 300 may deliver electrical signal 342 to coil 310. As seen in FIG. 3, electrical signal 342 travels through the path of coil 310 in the clockwise direction. Additionally, a magnetic flux 346 propagates outwards from pole piece 306 to non-moving member 308 through coil 310. Coil 310 includes four sides. As seen in FIG. 3, for each of the four sides of coil 310, electrical signal 342 flows in a direction that is perpendicular to the direction of magnetic flux 346. The electrical signal 342 flowing perpendicular to the direction of magnetic flux 346 may induce a Lorentz force directed outwards form the page of FIG. 3. This Lorentz force may counteract an acceleration force applied to proof mass 304 directed into the page of FIG. 3. The direction of the Lorentz force (e.g., into the page or outwards from the page) induced by electrical signal 342 may depend on the direction of electrical signal 342 within coil 310. For example, when electrical signal 342 flows through coil 310 in the clockwise direction, the resulting Lorentz force is directed outwards from the page. Alternatively, when electrical signal 342 flows through coil 310 in the counterclockwise direction, the resulting Lorentz force is directed into the page.

Figure 4:
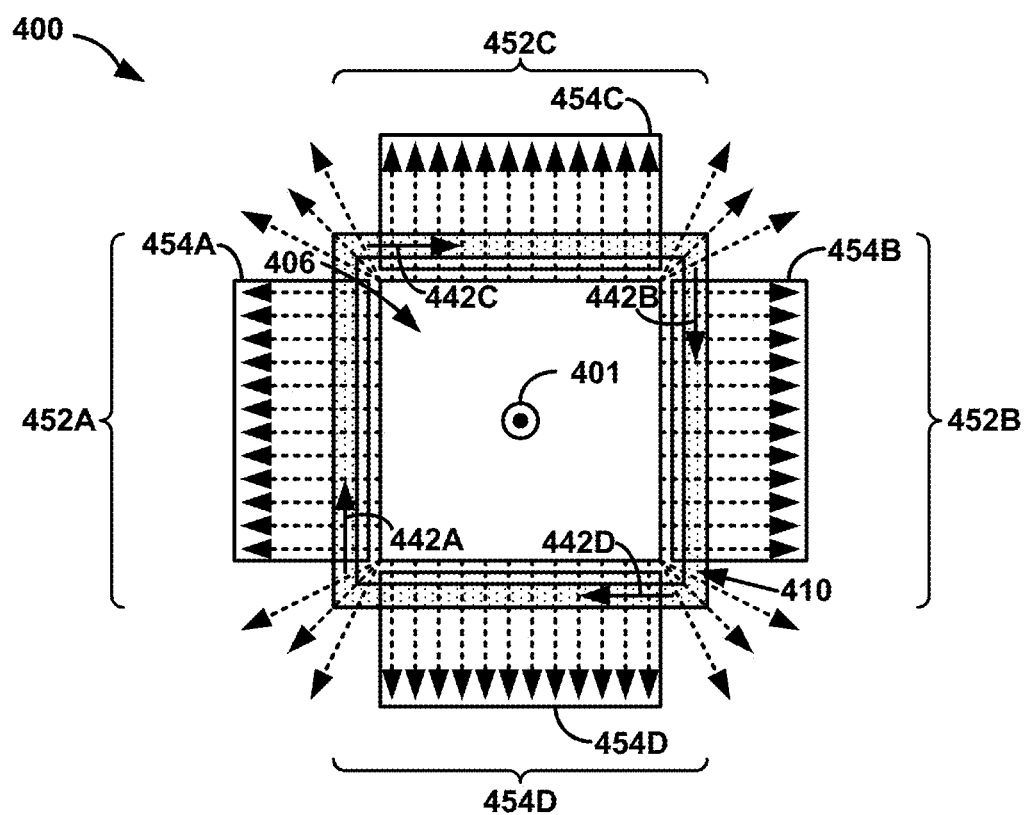
FIG. 4 is a conceptual diagram illustrating an electrical signal which travels through a coil and a magnetic flux emitted by a pole piece, in accordance with one or more techniques of this disclosure.

FIG. 4 is a conceptual diagram illustrating an electrical signal which travels through a coil 410 and a magnetic flux emitted by a pole piece 406, in accordance with one or more techniques of this disclosure. As seen in FIG. 4, electrical signal 442A-442D (collectively, "electrical signal 442") travels through coil 410 in a clockwise direction. Coil 410 includes a first side 452A, a second side 452B, a third side 452C, and a fourth side 452D (collectively, "sides 452"). Coil 410 may be a part of an accelerometer system which senses an acceleration along a sense axis 401, which extends outward from the page of FIG. 4 and into the page of FIG. 4. Magnetic flux 454A may travel from pole piece 406 through side 452A of coil 410, magnetic flux 454B may travel from pole piece 406 through side 452B of coil 410, magnetic flux 454C may travel from pole piece 406 through side 452C of coil 410, and magnetic flux 454D may travel from pole piece 406 through side 452D of coil 410. Pole piece 406 may be an example of any one or more of pole pieces 406 of FIG. 1, pole pieces 406 of FIG. 2, and pole piece 306 of FIG. 3. Coil 410 may be an example of any one or more of coils 110 of FIG. 1, coils 210 of FIG. 2, and coil 310 of FIG. 3.

Processing circuitry (not illustrated in FIG. 4) may deliver the electrical signal 442 to coil 410 such that electrical signal 442 travels around the path of coil 410 in a clockwise direction. Magnetic flux 454A-454D (collectively, "magnetic flux 454"), travels outwards from pole piece 406 such that magnetic flux 454 is normal to electrical signal 442. As seen in FIG. 4, electrical signal 442A is perpendicular to magnetic flux 454A, electrical signal 442B is perpendicular to magnetic flux 454B, electrical signal 442C is perpendicular to magnetic flux 454C, and electrical signal 442D is perpendicular to magnetic flux 454D. As such, electrical signal 442 is perpendicular to magnetic flux 454 at each of sides 452A-452D of coil 410, inducing a Lorentz force outward from the page of FIG. 4, where the Lorentz force is parallel to sense axis 401. In an example where electrical signal 442 travels around the path of coil 410 in a counterclockwise direction, this may induce a Lorentz force into the page of FIG. 4.

As seen in FIG. 4, a cross-section of pole piece 406 is square in shape, and a cross-section of coil 410 is square in shape with a square-shaped opening, such that pole piece 406 fits in the square-shaped opening of coil 410. The square shape of the cross-section of pole piece 406 may be beneficial for precisely measuring an acceleration along sense axis 401. For example, by emitting magnetic flux 454 from the straight edges of the pole piece which has a square cross-section, magnetic flux 454A is uniform in density. That is, a magnitude of a magnetic field is substantially the same at any point within magnetic flux 454A, a magnitude of a magnetic field is substantially the same at any point within magnetic flux 454B, a magnitude of a magnetic field is substantially the same at any point within magnetic flux 454C, and a magnitude of a magnetic field is substantially the same at any point within magnetic flux 454D.

A Lorentz force represents a cross-product of an electrical field and a magnetic field perpendicular to the electrical field. As such, a magnitude of the Lorentz force depends on both of the magnitude of the electrical field and a magnitude of the magnetic field. It may be beneficial for the magnitude of the electrical field represented by magnetic flux 454 to be uniform, so that sideways movements of coil 410 relative to pole piece 406 do not affect a magnitude of the Lorentz force representing the cross-product of electrical signal 442 and magnetic flux 454. In one or more examples where a cross-section of a pole piece is circular and without straight edges, the magnetic field emitted by the pole piece would not be uniform extending outwards form the pole piece. For example, a strength of the magnetic field would decrease moving away from the circular pole piece. This means that a movement of a coil disposed around the circular pole piece may affect a magnitude of the resulting Lorentz force, thus affecting a measured acceleration. As such, the accelerometer system 400 which includes a pole piece having a cross-section in the shape of a polygon (e.g., a square, a rectangular, a triangle, or another polygon) may determine an acceleration more precisely than an accelerometer system 400 which includes a pole piece having a cross-section with one or more rounded edges.

One or more techniques described herein may allow accelerometer system 400 to precisely determine an acceleration along sense axis 401, under conditions in which accelerometer system 400 vibrates according to a vector which is not parallel to sense axis 401. For example, vibrations along an axis which is not parallel to sense axis 401 may cause coil 410 to move "sideways" relative to pole piece 406. These sideways movements may cause the coil 410 to move relative to pole piece 406 such that coil 410 crosses through to a different part of the magnetic flux 454 than as compared with prior to the sideways movement of coil 410. Since a magnitude of the magnetic field of magnetic flux 454 is uniform in the areas of magnetic flux 454 illustrated in FIG. 4, sideways movements of coil 410 relative to pole piece 406 might not affect a magnitude of the Lorentz force produced by electrical signal 442 and magnetic flux 454.

Figure 5:
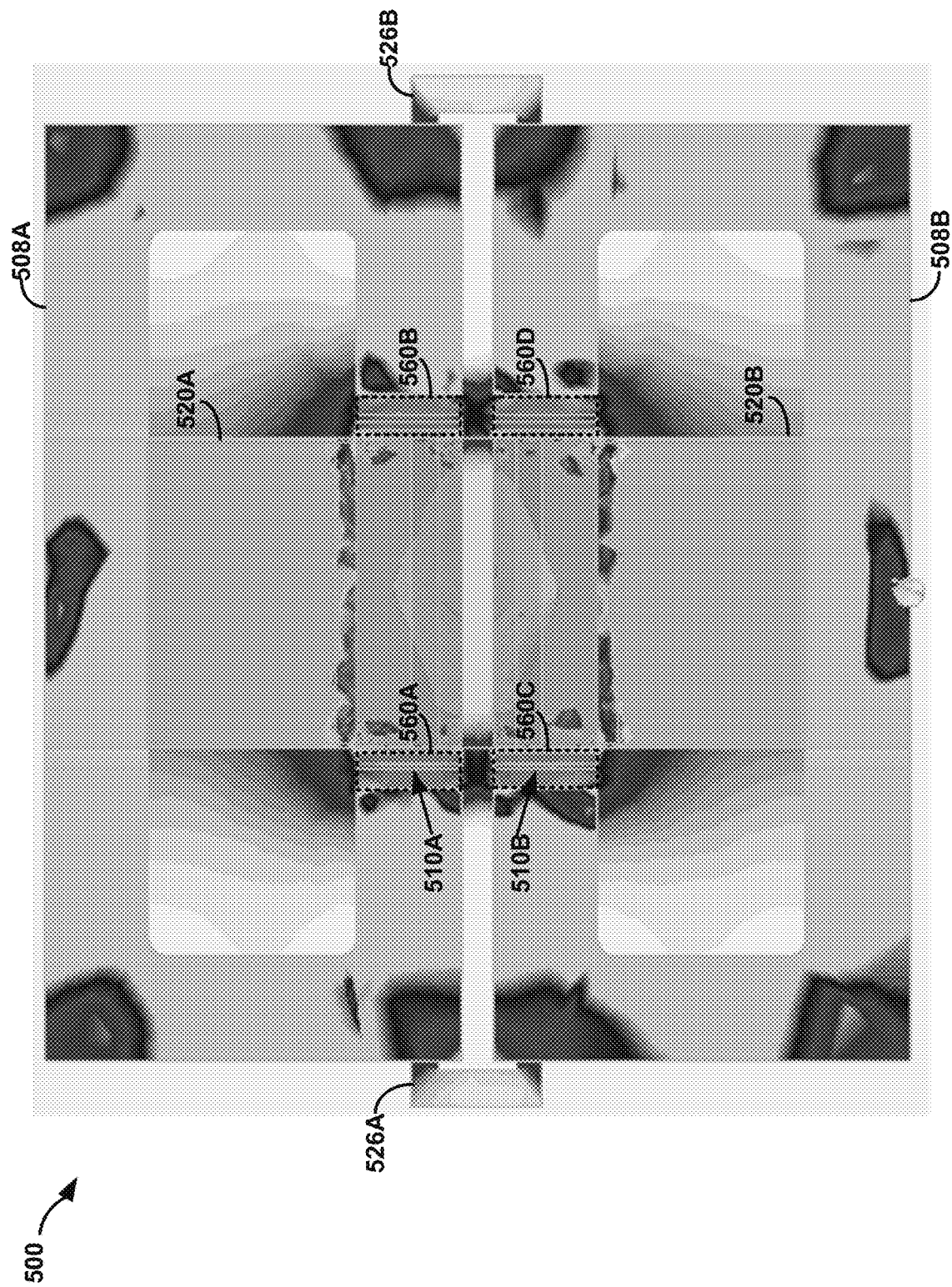
FIG. 5 is a conceptual diagram illustrating a magnetic field strength throughout a cross-section of accelerometer system, in accordance with one or more techniques of this disclosure.

FIG. 5 is a conceptual diagram illustrating a magnetic field strength throughout a cross-section of accelerometer system 500, in accordance with one or more techniques of this disclosure. Accelerometer system 500 includes non-moving members 508A-508B (collectively, "non-moving members 508"), coils 510A-510B (collectively, "coils 510"), and bands 526-526B (collectively, "bands 526"). Accelerometer system 500 may be an example of accelerometer system 100 of FIG. 1. Non-moving members 508 may be an example of non-moving members 108 of FIG. 1. Coils 510 may be an example of coils 110 of FIG. 1. Bands 526 may be an example of bands 226 of FIG. 2. FIG. 5 illustrates the strength of the magnetic field based on shade darkness. Darker shades represent stronger magnetic fields and lighter shades represent weaker magnetic fields.

Gap 560A represents a gap between non-moving member 508A and a first side of magnet 520A, which includes a corresponding pole piece. Gap 560B represents a gap between non-moving member 508A and a second side of magnet 520A. Gap 560C represents a gap between non-moving member 508B and a first side of magnet 520B, which includes a corresponding pole piece. Gap 560D represents a gap between non-moving member 508B and a second side of magnet 520B. As seen in FIG. 5, the shade within gaps 560A-560D is substantially uniform. This means that a movement of coil 510A within gaps 560A and 560B or a movement of coil 510B within gaps 560C and 560D will not change a strength of the magnetic field across coil 510A or a strength of the magnetic field across coil 510B, respectively. The magnetic field uniformity of gaps 560 is due to the face that magnet 520A and the corresponding pole piece are square in shape and magnet 520B and the corresponding pole piece are square in shape.

Figure 6:
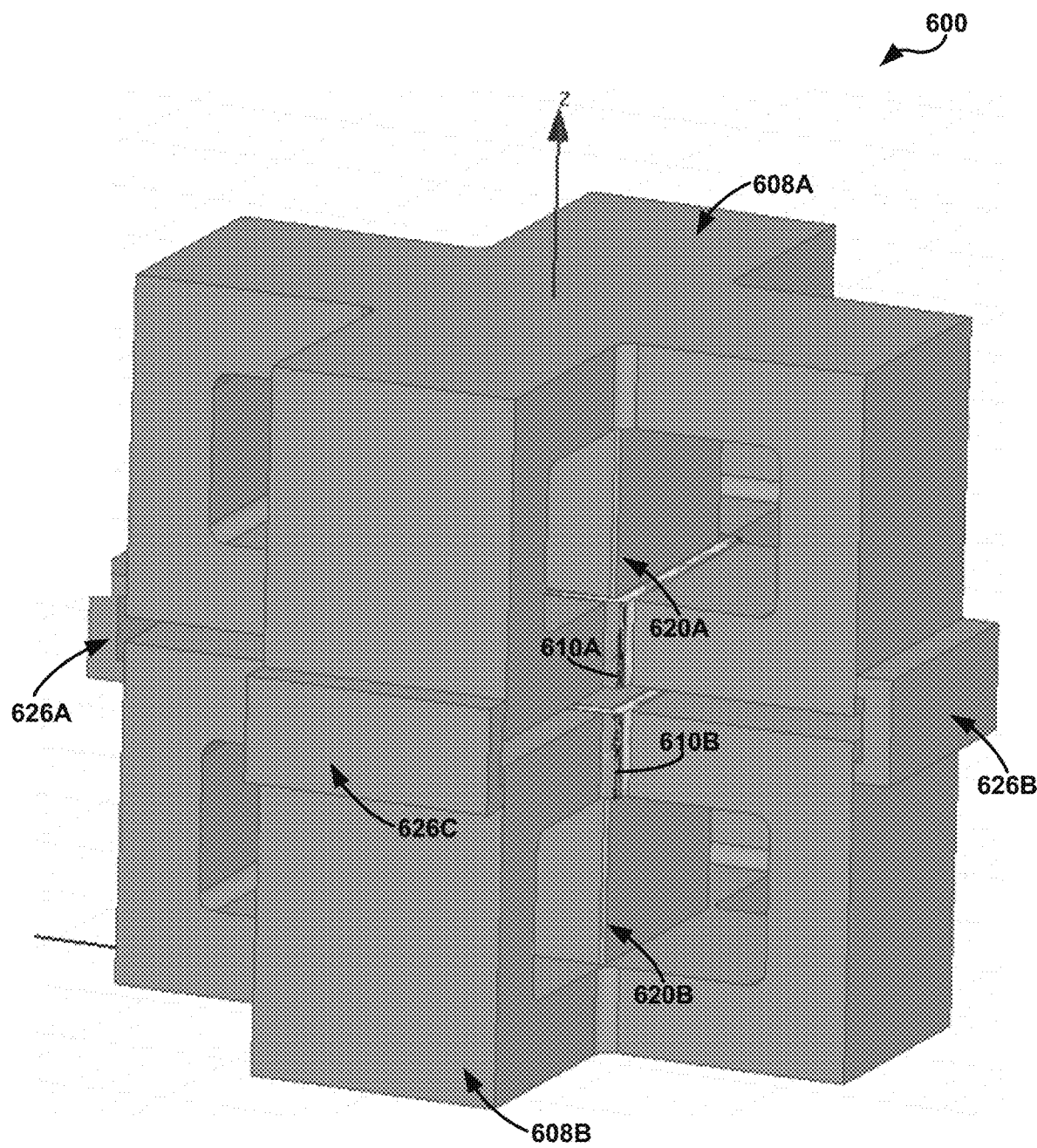
FIG. 6 is a conceptual diagram illustrating a perspective view of an accelerometer, in accordance with one or more techniques of this disclosure.

FIG. 6 is a conceptual diagram illustrating a perspective view of an accelerometer 600, in accordance with one or more techniques of this disclosure. The accelerometer 600 may, in some cases, represent the accelerometer shown in the cutaway views of any of FIGS. 2-5. As seen in FIG. 6, non-moving member 608A and 608B are fastened together using bands 626A-626C, as well as a fourth band which is not illustrated in FIG. 6. Magnets 620A and 620B are located at a center of accelerometer 600. Coil 610A is disposed around magnet 620A and Coil 610B is disposed around magnet 620B. Non-moving members 608 may be an example of non-moving member 208 of FIG. 2. Coils 610 may be an example of coils 210 of FIG. 2. Magnets 620 may be an example of magnets 220 of FIG. 2.

Figure 7:
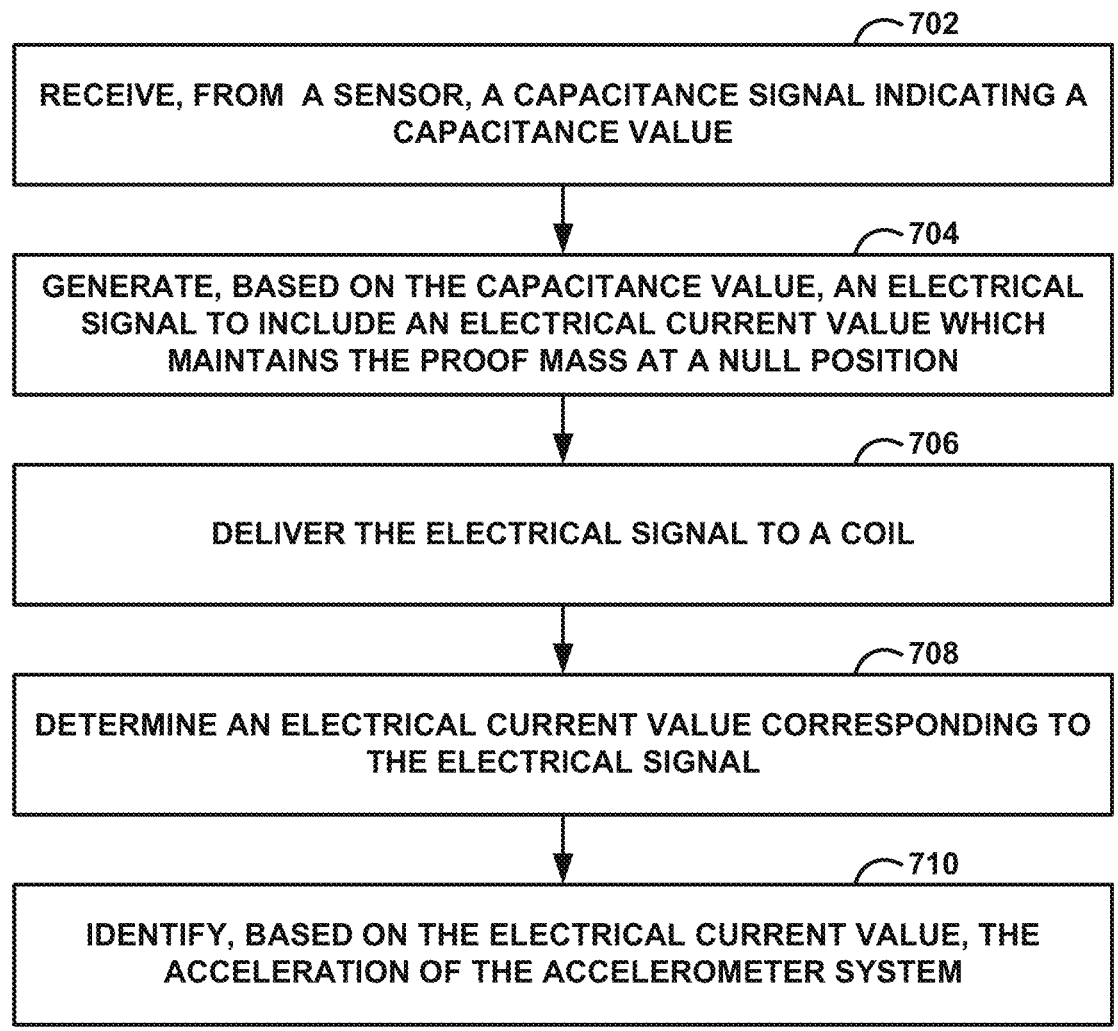
FIG. 7 is a flow diagram illustrating an example operation for determining an acceleration using an electromagnetic accelerometer, in accordance with one or more techniques of this disclosure.

FIG. 7 is a flow diagram illustrating an example operation for determining an acceleration using an electromagnetic accelerometer, in accordance with one or more techniques of this disclosure. FIG. 7 is described with respect to accelerometer system 100, of FIG. 1. However, the techniques of FIG. 7 may be performed by different components of accelerometer system 100 or by additional or alternative devices.

Processing circuitry 102 may receive, from first sensor 112A, a first capacitance signal which indicates a capacitance value (702). In some examples, first sensor 112A may represent a first capacitive plate (e.g., first capacitive plate 205A of FIG. 2) located on a first side of proof mass 104. Processing circuitry 102 may generate, based on the capacitance signal, an electrical signal to include an electrical current value which maintains proof mass 104 at a null position (704). Processing circuitry 102 may deliver the electrical signal to first coil 110A (706). In some examples, processing circuitry 102 may deliver the electrical signal to first coil 110A such that first coil 110A applies a Lorentz force to proof mass 104, counteracting an acceleration force applied to proof mass 104.

Processing circuitry 102 may determine an electrical current value corresponding to the electrical signal (708). Subsequently, processing circuitry 102 may identify, based on the electrical current value, the acceleration of accelerometer system 100 based on the electrical current value (710). In other words, the strength of the electrical signal required to maintain proof mass 104 in a null position is correlated with the acceleration of accelerometer system 100 along a sense axis.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. An accelerometer system comprising:
 a proof mass;
 a pole piece that extends along a longitudinal axis, wherein the pole piece is connected to the proof mass, wherein a cross section of the pole piece is rectangular in shape, wherein the cross section of the pole piece represents a cross section that is perpendicular to the longitudinal axis of the pole piece, and wherein the pole piece comprises a first pole piece outer side, a second pole piece outer side, a third pole piece outer side opposite the first pole piece outer side, and a fourth pole piece outer side opposite the second pole piece outer side;
 a coil having a cross section that is rectangular in shape, wherein the cross section of the coil is perpendicular to the longitudinal axis of the pole piece,
 wherein the coil comprises a first coil inner side, a second coil inner side, a third coil inner side opposite the first coil inner side, and a fourth coil inner side opposite the second coil inner side,
 wherein the coil is disposed around the pole piece so that a first space exists between the first pole piece outer side and the first coil inner side, a second space exists between the second pole piece outer side and the second coil inner side, a third space exists between the third pole piece outer side and the third coil inner side, and a fourth space exists between the fourth pole piece outer side and the fourth coil inner side, wherein the coil is connected to the proof mass; and
 circuitry configured to:
  deliver an electrical signal to the coil in order to maintain the proof mass at a null position;
  determine an electrical current value corresponding to the electrical signal; and identify, based on the electrical current value, an acceleration of the accelerometer system.

2. The accelerometer system of claim 1, wherein the accelerometer system further comprises:
a non-moving member,
wherein the circuitry is configured to:
receive, from a capacitance sensor, a capacitance signal indicating a capacitance value, wherein the capacitance value is correlated with a width of a gap between the proof mass and the non-moving member; and
generate the electrical signal to include an electrical current value which maintains the proof mass at the null position by maintaining the width of the gap between the proof mass and the non-moving member at a null gap width.

3. The accelerometer system of claim 2, wherein the pole piece is a first pole piece, wherein the coil is a first coil, wherein the electrical signal is a first electrical signal, wherein the electrical current value is a first electrical current value, and wherein the accelerometer system further comprises:
a second pole piece, wherein the second pole piece is connected to the proof mass; and
a second coil disposed around the second pole piece, wherein the second coil is connected to the proof mass, and wherein the second coil is rectangular in shape,
wherein the circuitry is further configured to:
deliver a second electrical signal to the second coil in order to maintain the proof mass at the null position;
determine a second electrical current value corresponding to the second electrical signal; and
identify, based on the second electrical current value and the first electrical current value, the acceleration of the accelerometer system.

4. The accelerometer system of claim 3, wherein the non-moving member is a first non-moving member, wherein the capacitance sensor is a first capacitance sensor, wherein the capacitance signal is a first capacitance signal, wherein the capacitance value is a first capacitance value, wherein the null gap width is a first null gap width, and wherein the acceleration system further comprises:
a second non-moving member,
wherein the circuitry is configured to:
receive, from a second capacitance sensor, a second capacitance signal indicating a second capacitance value, wherein the second capacitance value is correlated with a width of a gap between the proof mass and the second non-moving member; and
generate the second electrical signal to include a second electrical current value which maintains the proof mass at the null position by maintaining the width of the gap between the proof mass and the second non-moving member at a second null gap width.

5. The accelerometer system of claim 1, wherein the circuitry is configured to maintain the proof mass at the null position such that the longitudinal axis of the pole piece remains perpendicular to a plane of the proof mass.

6. The accelerometer system of claim 5, wherein the acceleration of the accelerometer system identified by the circuitry represents an acceleration perpendicular to the plane of the proof mass.

7. The accelerometer system of claim 1, wherein the circuitry is configured to identify the acceleration by calculating the acceleration based on a relationship between the electrical current value and the acceleration, wherein the electrical current value is positively correlated with the acceleration.

8. The accelerometer system of claim 1,
wherein a magnetic field at the first coil inner side is constant along a length of the first coil inner side from a first end of the first coil inner side to a second end of the first coil inner side,
wherein a magnetic field at the second coil inner side is constant along a length of the second coil inner side from a first end of the second coil inner side to a second end of the second coil inner side,
wherein a magnetic field at the third coil inner side is constant along a length of the third coil inner side from a first end of the third coil inner side to a second end of the third coil inner side, and
wherein a magnetic field at the fourth coil inner side is constant along a length of the fourth coil inner side from a first end of the fourth coil inner side to a second end of the fourth coil inner side.

9. The accelerometer system of claim 1,
wherein the coil is configured to receive a magnetic flux from the pole piece, wherein the magnetic flux passes through the coil to a non-moving member, and
wherein by delivering the electrical signal to the coil, the circuitry is configured to induce a flow of the electrical current around a path of the coil, causing a force to maintain the proof mass at the null position.

10. The accelerometer system of claim 9, wherein a magnitude of the force represents a cross-product of a magnitude of the electrical current which flows around the path of the coil and a magnitude of the magnetic flux which passes through the coil.

11. A method comprising:
delivering, by circuitry of an accelerometer system, an electrical signal to a coil in order to maintain a proof mass at a null position, wherein the accelerometer system comprises:
the proof mass;
a pole piece that extends along a longitudinal axis, wherein the pole piece is connected to the proof mass, wherein a cross section of the pole piece is rectangular in shape, wherein the cross section of the pole piece represents a cross section that is perpendicular to the longitudinal axis of the pole piece, and wherein the pole piece comprises a first pole piece outer side, a second pole piece outer side, a third pole piece outer side opposite the first pole piece outer side, and a fourth pole piece outer side opposite the second pole piece outer side;
the coil having a cross section that is rectangular in shape, wherein the cross section of the coil is perpendicular to the longitudinal axis of the pole piece, wherein the coil comprises a first coil inner side, a second coil inner side, a third coil inner side opposite the first coil inner side, and a fourth coil inner side opposite the second coil inner side,
wherein the coil is disposed around the pole piece so that a first space exists between the first pole piece outer side and the first coil inner side, a second space exists between the second pole piece outer side and the second coil inner side, a third space exists between the third pole piece outer side and the third coil inner side, and a fourth space exists between the fourth pole piece outer side and the fourth coil inner side, wherein the coil is connected to the proof mass; and the circuitry;
determining, by the circuitry, an electrical current value corresponding to the electrical signal; and
identifying, by the circuitry based on the electrical current value, an acceleration of the accelerometer system.

12. The method of claim 11, further comprising:
receiving, by the circuitry from a capacitance sensor, a capacitance signal indicating a capacitance value, wherein the capacitance value is correlated with a width of a gap between the proof mass and the non-moving member; and
generating, by the circuitry, the electrical signal to include an electrical current value which maintains the proof mass at the null position by maintaining the width of the gap between the proof mass and the non-moving member at a null gap width.

13. The method of claim 12, wherein the pole piece is a first pole piece, wherein the coil is a first coil, wherein the electrical signal is a first electrical signal, wherein the electrical current value is a first electrical current value, and wherein the method further comprises:
delivering, by the circuitry, a second electrical signal to a second coil in order to maintain the proof mass at the null position, wherein the accelerometer system further comprises:
a second pole piece, wherein the second pole piece is connected to the proof mass; and
a second coil disposed around the second pole piece, wherein the second coil is connected to the proof mass, and wherein the second coil is rectangular in shape;
determining a second electrical current value corresponding to the second electrical signal; and
identifying, based on the second electrical current value and the first electrical current value, the acceleration of the accelerometer system.

14. The method of claim 13, wherein the non-moving member is a first non-moving member, wherein the capacitance sensor is a first capacitance sensor, wherein the capacitance signal is a first capacitance signal, wherein the capacitance value is a first capacitance value, wherein the null gap width is a first null gap width, and wherein the method further comprises:
receiving, by the circuitry from a second capacitance sensor, a second capacitance signal indicating a second capacitance value, wherein the second capacitance value is correlated with a width of a gap between the proof mass and a second non-moving member; and
generating, by the circuitry, the second electrical signal to include a second electrical current value which maintains the proof mass at the null position by maintaining the width of the gap between the proof mass and the second non-moving member at a second null gap width.

15. The method of claim 11, further comprising maintaining the proof mass at the null position such that the longitudinal axis of the pole piece remains perpendicular to a plane of the proof mass.

16. The method of claim 11, further comprising identifying the acceleration by calculating the acceleration based on a relationship between the electrical current value and the acceleration, wherein the electrical current value is positively correlated with the acceleration.

17. The method of claim 11, further comprising:
receiving, by the coil, a magnetic flux from the pole piece, wherein the magnetic flux passes through the coil to a non-moving member, and
wherein by delivering the electrical signal to the coil, the method further comprises:
inducing a flow of the electrical current around a path of the coil, causing a force to maintain the proof mass at the null position.

18. An accelerometer system comprising:
a coil disposed around a pole piece that extends along a longitudinal axis, wherein the coil is connected to a proof mass, wherein a cross section of the pole piece is rectangular in shape, wherein the cross section of the pole piece represents a cross section that is perpendicular to the longitudinal axis of the pole piece, and wherein the pole piece comprises a first pole piece outer side, a second pole piece outer side, a third pole piece outer side opposite the first pole piece outer side, and a fourth pole piece outer side opposite the second pole piece outer side,
wherein the coil comprises a cross section that is rectangular in shape, wherein the cross section of the coil is perpendicular to the longitudinal axis of the pole piece,
wherein the coil comprises a first coil inner side, a second coil inner side, a third coil inner side opposite the first coil inner side, and a fourth coil inner side opposite the second coil inner side,
wherein the coil is disposed around the pole piece so that a first space exists between the first pole piece outer side and the first coil inner side, a second space exists between the second pole piece outer side and the second coil inner side, a third space exists between the third pole piece outer side and the third coil inner side, and a fourth space exists between the fourth pole piece outer side and the fourth coil inner side; and
circuitry configured to:
deliver an electrical signal to the coil in order to maintain the proof mass at a null position;
determine an electrical current value corresponding to the electrical signal; and
identify, based on the electrical current value, an acceleration of the accelerometer system.

* * * * *